(12) United States Patent
Sung et al.

(10) Patent No.: US 8,145,252 B2
(45) Date of Patent: Mar. 27, 2012

(54) METHOD FOR INTER-CELL INTERFERENCE MITIGATION FOR A MOBILE COMMUNICATION SYSTEM

(75) Inventors: Dan Keun Sung, Daejeon (KR); Bang Chul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 619 days.

(21) Appl. No.: 11/846,106

(22) Filed: Aug. 28, 2007

(65) Prior Publication Data

US 2008/0057996 A1    Mar. 6, 2008

(30) Foreign Application Priority Data

Aug. 30, 2006 (KR) .................... 10-2006-0082991

(51) Int. Cl.
*H04B 7/00* (2006.01)
(52) U.S. Cl. ........................................ 455/522
(58) Field of Classification Search .................. None
See application file for complete search history.

(56) References Cited

U.S. PATENT DOCUMENTS

| | | | |
|---|---|---|---|
| 6,230,023 B1 * | 5/2001 | Slanina ........................ | 455/522 |
| 6,385,437 B1 | 5/2002 | Park et al. | |
| 6,584,325 B1 * | 6/2003 | Shakhgildian ................ | 455/525 |
| 6,643,520 B1 * | 11/2003 | Park et al. .................... | 455/522 |
| 6,671,266 B1 * | 12/2003 | Moon et al. ................... | 370/342 |
| 6,708,041 B1 | 3/2004 | Butovitsch et al. | |
| 6,794,858 B2 | 9/2004 | Ishii | |
| 6,801,767 B1 * | 10/2004 | Schwartz et al. ........... | 455/426.2 |
| 6,813,479 B2 | 11/2004 | Voyer | |
| 6,934,340 B1 | 8/2005 | Dollard | |
| 7,668,564 B2 | 2/2010 | Onggosanusi et al. | |
| 2001/0014612 A1 * | 8/2001 | Uesugi ......................... | 455/522 |
| 2001/0017851 A1 * | 8/2001 | Yamaguchi et al. .......... | 370/332 |
| 2002/0001336 A1 * | 1/2002 | Hosomi ........................ | 375/130 |
| 2002/0062472 A1 * | 5/2002 | Medlock et al. .................. | 716/1 |

(Continued)

FOREIGN PATENT DOCUMENTS

JP          08-107382        4/1996

(Continued)

OTHER PUBLICATIONS

Office Action dated Apr. 19, 2010 (for co-pending U.S. Appl. No. 11/846,093).

(Continued)

*Primary Examiner* — Yuwen Pan
*Assistant Examiner* — Ayodeji Ayotunde
(74) *Attorney, Agent, or Firm* — H.C. Park & Associates, PLC

(57) ABSTRACT

A method for reducing inter-cell interference (ICI) in a mobile communication system controls transmission signal power of an uplink signal from a terminal based on signal power measurement for a signal received from a base station of a neighboring cell. A terminal receives a signal from a base station of a neighboring cell via a wireless channel, measures a channel response against a threshold value across an applicable frequency band by using the received signal, determines a transmission signal power for each frequency band used for data transmission based on the measured channel response, and transmits data to a home cell base station according to the transmission signal power for each frequency band. The terminal may measure a channel response based on signals received from multiple base stations in multiple neighboring cells, and may also evaluate signal power of a signal transmitted from the home cell.

20 Claims, 9 Drawing Sheets

U.S. PATENT DOCUMENTS

| | | | |
|---|---|---|---|
| 2002/0077141 A1* | 6/2002 | Hwang et al. | 455/522 |
| 2002/0118724 A1* | 8/2002 | Kishimoto et al. | 375/132 |
| 2002/0145968 A1 | 10/2002 | Zhang et al. | |
| 2003/0128658 A1* | 7/2003 | Walton et al. | 370/208 |
| 2004/0162100 A1* | 8/2004 | Moon et al. | 455/522 |
| 2004/0253962 A1* | 12/2004 | Ganti et al. | 455/452.1 |
| 2005/0286547 A1* | 12/2005 | Baum et al. | 370/437 |
| 2006/0030324 A1* | 2/2006 | Hsu et al. | 455/437 |
| 2006/0092875 A1* | 5/2006 | Yang et al. | 370/329 |
| 2006/0094372 A1* | 5/2006 | Ahn et al. | 455/67.13 |
| 2006/0121901 A1 | 6/2006 | Tanaka et al. | |
| 2007/0046459 A1* | 3/2007 | Silverman et al. | 340/539.13 |

FOREIGN PATENT DOCUMENTS

| | | |
|---|---|---|
| JP | 11-155172 | 6/1999 |
| JP | 11-341555 | 12/1999 |
| JP | 2000-013310 | 1/2000 |
| JP | 2004-260467 | 9/2004 |
| JP | 2005-020566 | 1/2005 |
| JP | 2005-318327 | 11/2005 |
| WO | 2005/101882 | 10/2005 |
| WO | 2005-117283 | 12/2005 |

OTHER PUBLICATIONS

Notice of Allowance of U.S. Appl. No. 11/846,093 issued on Oct. 7, 2010.

Tse, et al. "Fundamentals of Wireless Communication," 2005, pp. 183-184, Cambridge University Press.

* cited by examiner

METHOD FOR INTER-CELL INTERFERENCE MITIGATION FOR A MOBILE COMMUNICATION SYSTEM

CROSS REFERENCE TO RELATED APPLICATION

This application claims priority from and the benefit of Korean Patent Application No. 10-2006-0082991, filed on Aug. 30, 2006, which is incorporated by reference for all purposes as if fully set forth herein.

BACKGROUND OF THE INVENTION

1. Field of the Invention

The present invention relates to a mobile communication system with reduced inter-cell interference (ICI) and a method thereof, and more particularly, to a mobile communication system with reduced ICI by controlling an uplink signal's transmission signal power based on power measurement of a signal received from a base station, and a method thereof.

2. Discussion of the Background

Mobile communication technology includes a mobile communication device usable by a user in a moving object, such as a train, a ship, or an airplane, or while the user is walking. FIG. 1 illustrates a cell structure of a mobile communication system in which a mobile communication device may be used according to the conventional art.

As shown in FIG. 1, a mobile communication system includes base stations 111, 112, and 113, and mobile communication devices, which may be referred to as mobile stations or a mobile communication terminals (hereinafter, referred to individually as a "terminal") 121, 122, and 123. Each base station 111, 112, and 113 provides mobile communication services to a respective wireless communication area called a "cell." Each terminal 121, 122, and 123 may be located in a cell corresponding to one of the base stations 111, 112, and 113, and respectively receives mobile communication service via the base stations 111, 112, and 113.

In this instance, a base station 111, 112, or 113 in a cell may be affected by multiple access interference corresponding to signal interference from a terminal located within the cell, and inter-cell interference (ICI) corresponding to signal interference from a terminal located in a neighboring cell.

Orthogonal frequency division multiplexing (OFDM) technology has been developed, and may be able to reduce multiple access interference. However, ICI, and in particular, ICI of an uplink channel has not been solved through the use of OFDM.

In many mobile communication systems, a terminal near a cell boundary may have signal distortion due to the ICI. Accordingly, for reliable data transmission, channel coding is performed with an extremely low channel coding rate and then data is transmitted. For example, a portable internet Wireless Broadband (WiBro) standard uses a coding rate of 1/12.

Various solutions have been proposed for reducing the ICI problem. FIG. 2 illustrates an example of a frequency band allocation method based on fractional frequency reuse (FFR) according to the conventional art.

Referring to FIG. 2, terminals located in the centers of cell (1) 221 (cell 221), cell (2) 222 (cell 222), and cell (3) 223 (cell 223), use the same frequency band 210. However, a terminal near a cell boundary may not use one predetermined frequency band from among three frequency bands 211, 212, and 213 or may use the predetermined frequency band at a lower power to avoid frequency duplication with a neighboring cell. For example, a terminal near a boundary of the cell 221 may not use a first fractional frequency band 211 or may use the first fractional frequency band 211 with a low power. Also, another terminal near to a boundary of the cell 222 may not use a second fractional frequency band 212 or may use the second fractional frequency band 212 with a low power. Also, still another terminal near to a boundary of the cell 223 may not use a third fractional frequency band 213 or may use the third fractional frequency band 213 with a low power. As a result, the terminal may reduce ICI, but a frequency reuse factor of a terminal located in an outer boundary of a cell is reduced to 2/3 without regard for the actual use of the three frequency bands prior to avoiding frequency duplication with a neighboring cell.

FIG. 3 illustrates another frequency band allocation method for ICI reduction according to the conventional art. Referring to FIG. 3, a cell is divided into a central area (a white area) and an outer boundary (a shaded area). In this instance, frequency bands are allocated so that a mobile terminal in the central area may use a common frequency band with neighboring cells, and a terminal of the outer boundary may use a frequency band that is not used in neighboring cells.

Specifically, a cell (2) 302 (cell 302), a cell (3) 303 (cell 303), a cell (4) 304 (cell 304), a cell (5) 305 (cell 305), a cell (6) 306 (cell 306), and a cell (7) 307 (cell 307) neighbor a cell (1) 301 (cell 301). A first frequency band is allocated to an outer boundary of the cell 301, but is not duplicated with a second frequency band or a third frequency band allocated to outer boundaries of the cells 302 through 307. An outer boundary area of the first frequency band is allocated is marked in black. Also, the cells 302, 304, and 306, which are allocated with the second frequency band and for which the outer boundaries are hatched with dots, are spaced apart from each other. Also, the cells 303, 305, and 307, which are allocated with the third frequency band and for which the outer boundaries are hatched with diagonal lines, are spaced apart from each other. Specifically, the ICI reduction scheme shown in FIG. 3 may allocate a frequency band not to be used between neighboring cells in an outer boundary with the most severe ICI, and thereby reducing the ICI.

In addition to the ICI reduction schemes described with reference to FIG. 2 and FIG. 3, other various types of ICI reduction schemes have also been proposed. The ICI reduction schemes are commonly based on an idea of ICI coordination/avoidance that limits frequency use time or frequency resource for a terminal located in an outer boundary of a cell.

However, the ICI reduction schemes based on the ICI coordination/avoidance, including the FFR scheme, have many problems.

First, in practice, a cell area has a distorted shape that is different than a theoretical hexagonal cell arrangement. Accordingly, it is more difficult to separately manage frequency bands for the central area and the outer boundary.

Second, since an available frequency band is reduced, trunking efficiency may be reduced. Specifically, wireless resources may be exhausted when more terminals are located in the outer boundary of the cell.

Third, in comparison to when the same entire frequency band is used in all cells, frequency hopping may be reduced. Accordingly, frequency diversity effect may be reduced, and thus a multi-path signal may not be effectively processed.

Fourth, since a frequency band is allocated to a terminal located in an outer boundary of a cell based on a relation with a neighboring cell, flexible cell planning is difficult. For example, adding an additional base station and an additional cell between existing cells, a new frequency band should be allocated to cells adjacent to the additional cell, and this may require the modification of the cell planning.

Fifth, a portion of the frequency band may be unused even when there is no ICI. Accordingly, wireless resources may not be effectively managed.

Finally, in the conventional ICI reduction schemes as described above, an upper layer service control point (SCP) or a mobile switching center (MSC) should be in charge of cell planning and coordination for a plurality of base stations. However, this is inconsistent with ALL-Internet Protocol (IP), which is of the trend for the next generation communication network.

Accordingly, there is a need for a new technology in which a mobile communication system can adaptively manage uplink resources to reduce ICI.

SUMMARY OF THE INVENTION

This invention provides an ICI reduction method and an uplink channel resources management method for a mobile communication system.

This invention also provides a mobile communication system and mobile communication terminal able to reduce ICI and manage uplink channel resources.

Additional features of the invention will be set forth in the description which follows, and in part will be apparent from the description, or may be learned by practice of the invention.

The present invention discloses a method for managing uplink channel resources in a mobile communication terminal located in a first cell. The method includes measuring a received signal power of a first downlink channel signal for a plurality of frequency bands, the first downlink channel signal transmitted from a base station of a second cell, and determining a transmission signal power of an uplink channel signal for the plurality of frequency bands based on the measured received signal power.

The present invention also discloses a method for reducing interference in a mobile communication system. The method includes receiving a pilot signal from a base station via a wireless channel, measuring a channel response of the wireless channel by using the pilot signal, determining a transmission signal power for each of a plurality of frequency bands used for data transmission based on the measured channel response, and transmitting data to a base station based on the transmission signal power for each frequency band.

The present invention also discloses a mobile communication terminal including a pilot signal receiver to receive a pilot signal from a base station via a wireless channel, a band response measurement unit to measure a channel response of the wireless channel for a plurality of frequency bands by using the received pilot signal, a band selector to select a transmission frequency band for data transmission based on the channel response, and a data transmitter to transmit data to a base station of a home cell via the transmission frequency band.

The present invention also discloses a mobile communication system including a base station to transmit a pilot signal via a wireless channel, the wireless channel including a plurality of frequency bands, and a mobile communication terminal to measure a channel response of the wireless channel using the pilot signal, and to determine a transmission signal power for each frequency band based on the channel response. Further, the base station is located in a first cell and the mobile communication terminal is located in a second cell neighboring the first cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
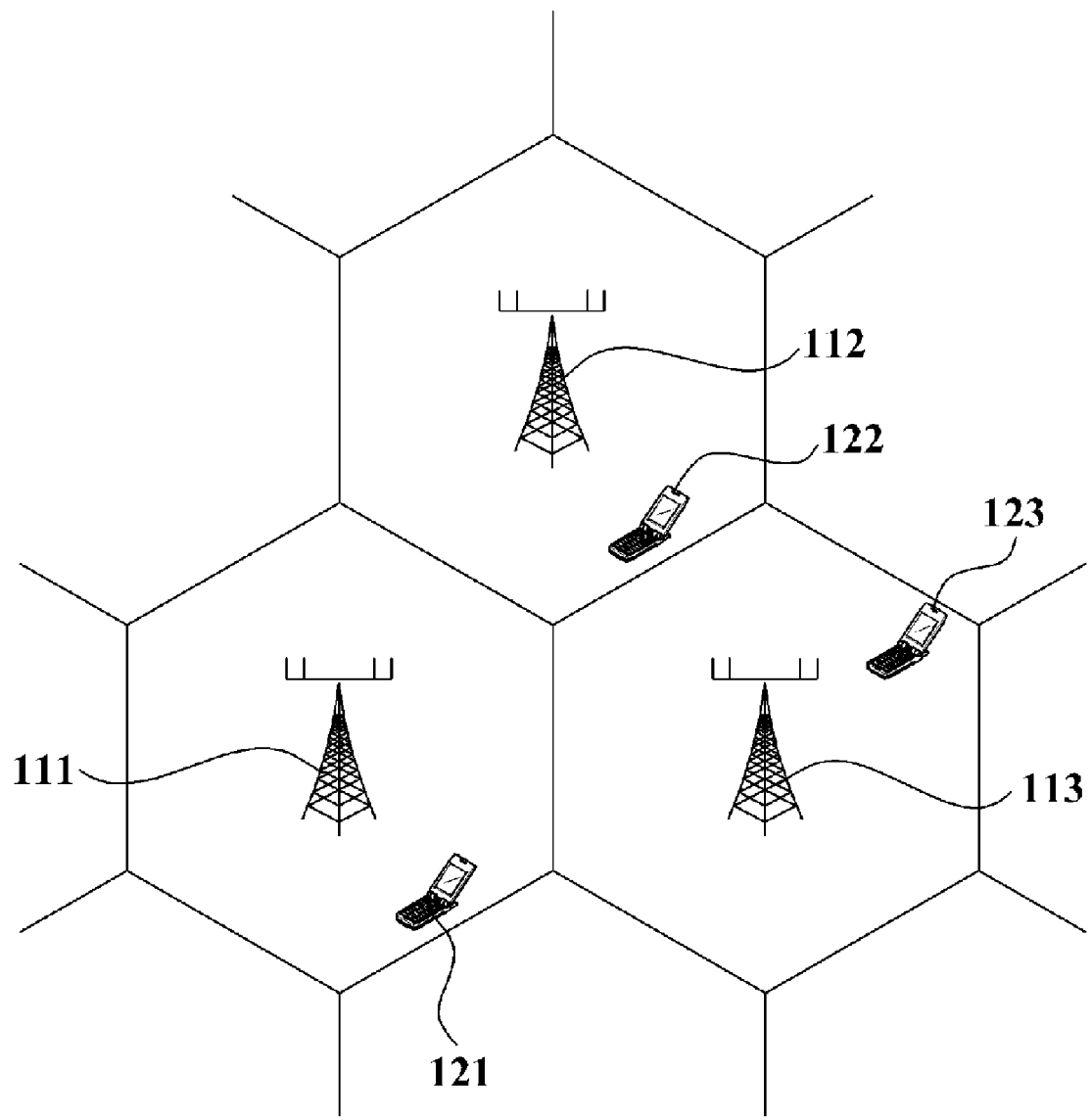
FIG. 1 illustrates a cell structure of a mobile communication system according to the conventional art.
Figure 2:
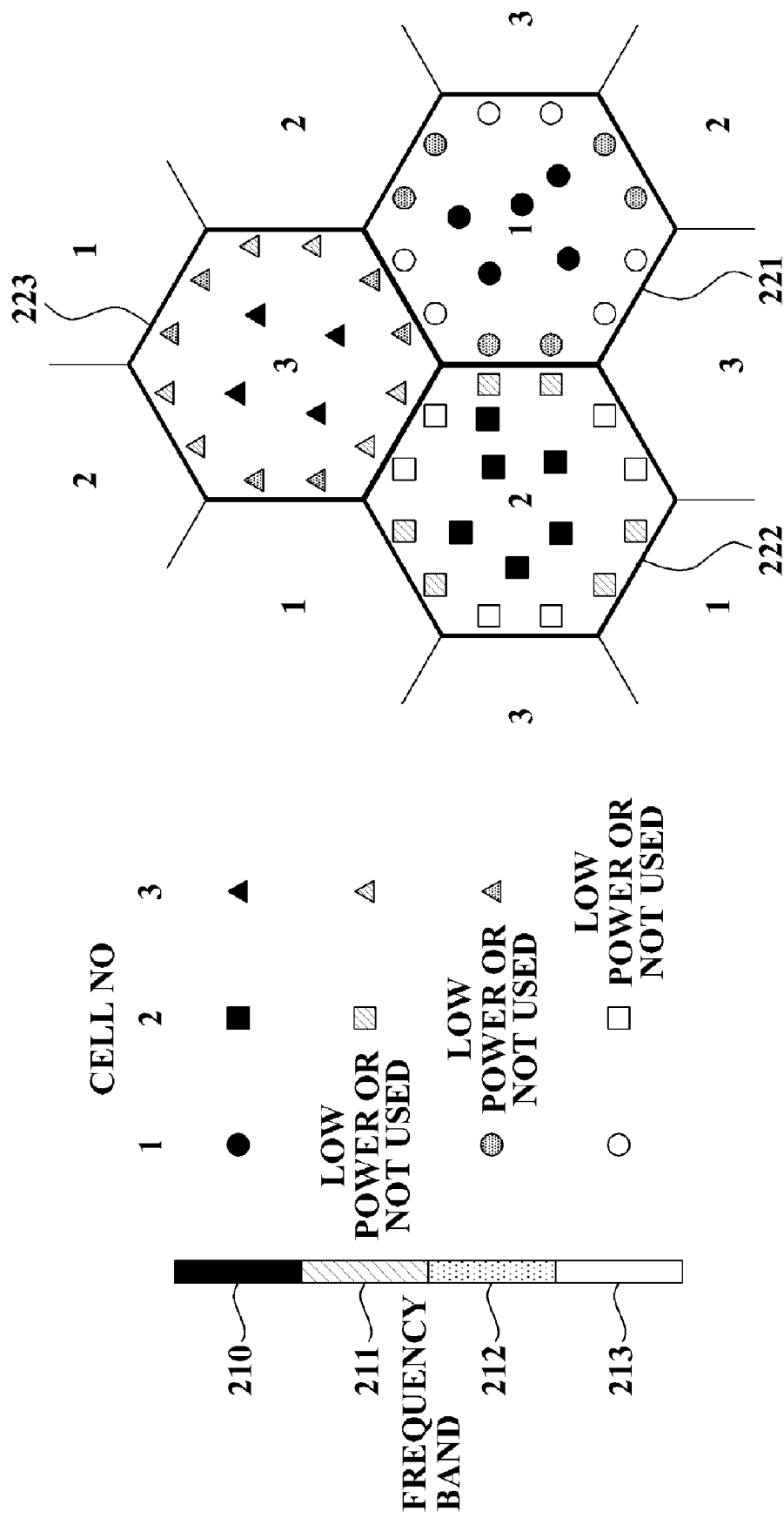
FIG. 2 illustrates an example of a frequency band allocation method based on fractional frequency reuse (FFR) according to the conventional art.
Figure 3:
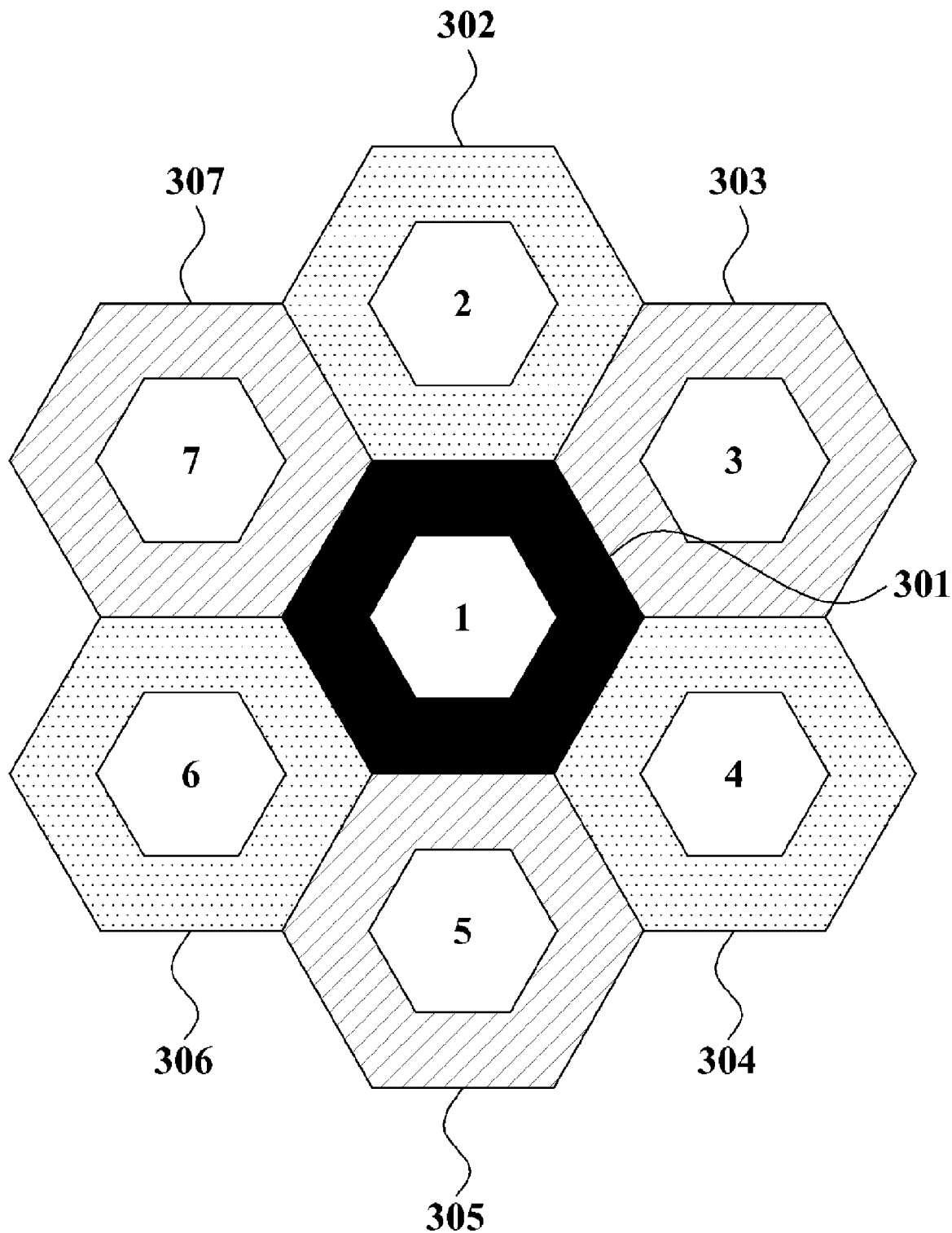
FIG. 3 illustrates another example of a frequency band allocation method according to the conventional art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element or intervening elements may also be present. In contrast, when an element is referred to as being "directly connected to" another element, there are no intervening elements present.

Reference will now be made in detail to exemplary embodiments of the present invention as shown in the accompanying drawings.

Figure 4:
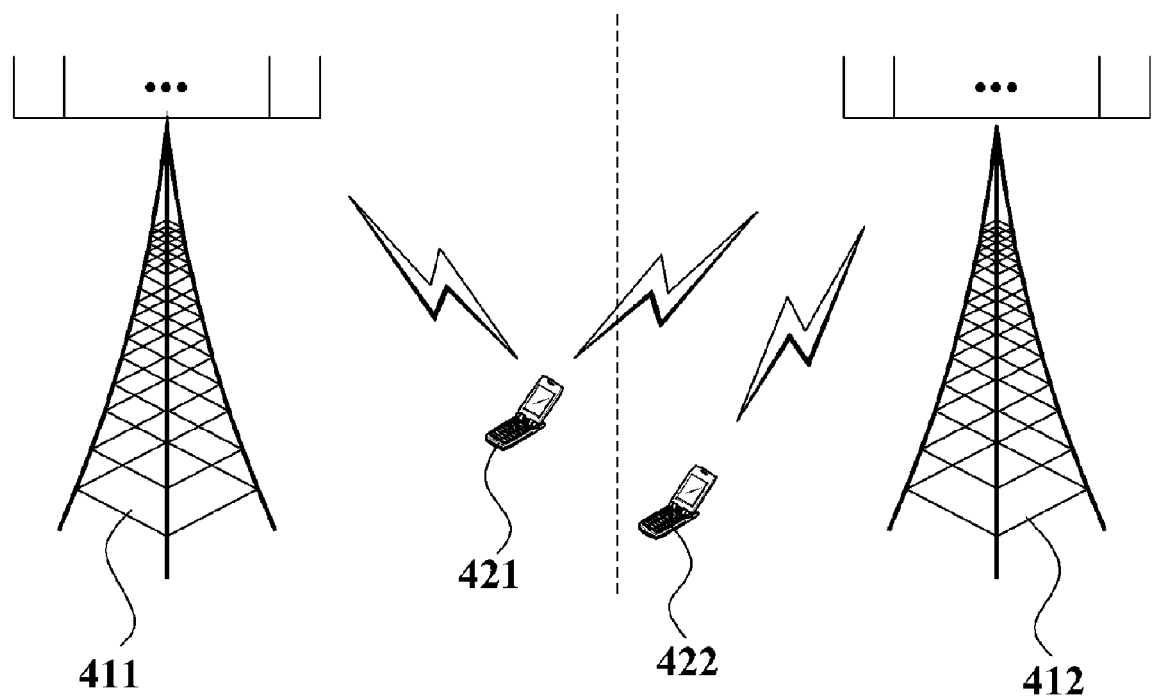
FIG. 4 illustrates a method for transmitting and receiving a signal between a terminal located in a first cell and a base station of a neighboring cell in a mobile communication system according to an exemplary embodiment of the present invention.

FIG. 4 illustrates a method for transmitting and receiving a signal between a terminal located in a first cell and a base station of a neighboring cell in a mobile communication system according to an exemplary embodiment of the present invention.

Referring to FIG. 4, a first terminal 421 transmits and receives data with a first base station 411 belonging to a first cell, and a second terminal 422 transmits and receives data with a second base station 412 belonging to a second cell. If the first terminal 421 is located in the first cell and transmits data to the first base station 411 of the first cell via an uplink channel, ICI may occur in a transmission signal from the second terminal 422 in the second cell to the second base station 412 of the second cell.

According to an embodiment of the present invention, a downlink signal may be received at a terminal from a base station in a neighboring cell. The mobile communication system may measure a downlink channel response associated with the neighboring cell by using the received downlink signal, and control the power for a particular frequency band to reduce ICI in the neighboring cell on that particular frequency band based on the measured downlink channel response. Accordingly, ICI may be reduced.

Accordingly, a mobile communication system according to an embodiment of the present invention may estimate an uplink channel response based on a downlink channel response.

A representative example of the mobile communication system includes an orthogonal frequency division multiplexing (OFDM) system based on a Time Division Duplexing (TDD) scheme. Accordingly, the present invention may be applicable to various systems, such as a wireless local area network (WLAN), a TDD mode of a next generation mobile communication system, which is being currently discussed in a 3$^{rd}$ Generation Partnership Project Long Term Evolution (3GPP LTE) specification, a Wireless Broadband (WiBro) system, or WiBro Evolution.

However, the present invention is not limited thereto. Specifically, the present invention may be widely applicable to systems that can measure a downlink channel response and estimate an uplink channel response. Thus, the present invention may be applicable to any types of mobile communication systems in which the downlink channel response and the uplink channel response have a certain correlation therebetween, and thus the correlation may be known in advance or measurable.

Hereinafter, exemplary embodiments of the present invention will be described for a mobile communication system based on an OFDM system based on a TDD scheme, which is for convenience of description, and are not limited thereto. In this case, the downlink channel response and the uplink channel response between the first terminal 421 located in the first cell and the second base station 412 of the second cell are identical so the correlation between downlink channel response and uplink channel response is known.

Figure 5A:
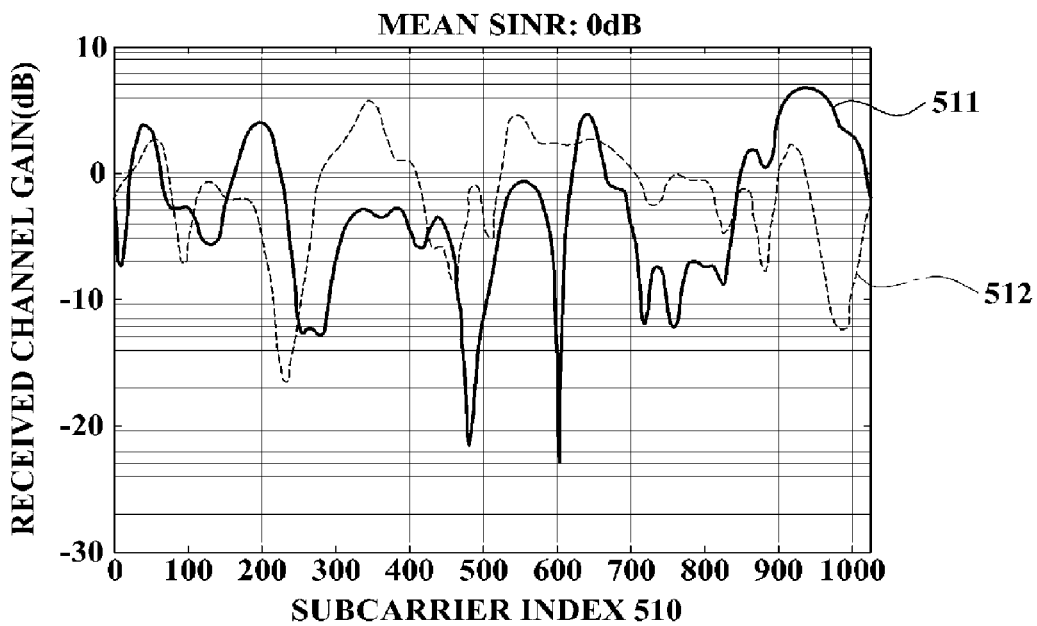
FIG. 5A is a graph illustrating the channel gain of a channel signal received from a base station of a home cell and a channel signal received from a neighboring cell measured by a terminal according to an exemplary embodiment of the present invention.
Figure 5B:
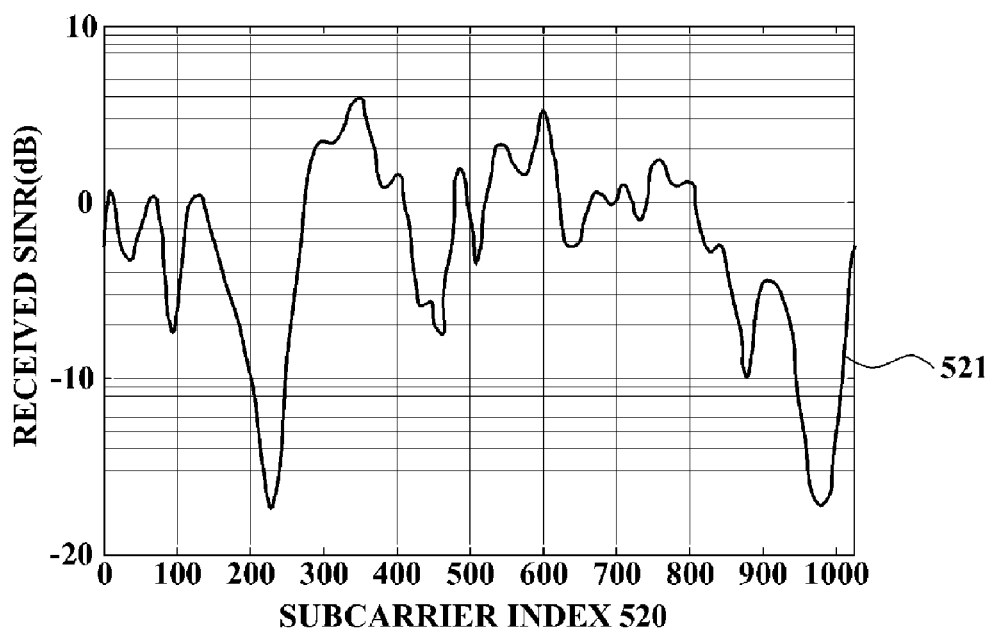
FIG. 5B is a graph illustrating a Signal-to-Interference plus Noise Ratio (SINR) based on the measured signal strength of the channel signal received from a base station of a home cell and the measured signal strength of the channel signal received from a neighboring cell according to an exemplary embodiment of the present invention.

FIG. 5A is a graph illustrating the channel gain of a channel signal received from a base station of a home cell and a channel signal received from a neighboring cell measured by a terminal according to an exemplary embodiment of the present invention. FIG. 5B is a graph illustrating a Signal-to-Interference plus Noise Ratio (SINR) based on the measured signal strength of the channel signal received from a base station of a home cell and the measured signal strength of the channel signal received from a neighboring cell according to an exemplary embodiment of the present invention.

More specifically, FIG. 5A and FIG. 5B are graphs illustrating a downlink channel response, which may be measured by using a pilot signal received by the first terminal 421 of FIG. 4 and the second terminal 422 from the second base station 412. The graph 510 and graph 520 of FIG. 5A and FIG. 5B, respectively, show the downlink channel response measured for various frequency bands.

Referring to FIG. 5A, a received channel gain 511 of the downlink channel measured by the first terminal 421 is indicated by a solid line. A received channel gain 512 of the downlink channel measured by the second terminal 422 is indicated by a dotted line. If the uplink channel response is identical to the downlink channel response as described above, the downlink channel response shown in the graph 510 also indicates an uplink channel response of an uplink channel in which data is transmitted from the first terminal 421 and the second terminal 422 to the second base station 412.

Thus, if the first terminal 421 and the second terminal 422 each transmit a signal to the second base station 412 via the uplink channel with the above-described channel response, the second base station 412 may identify the signal transmitted from the first terminal 421 as noise. Accordingly, when disregarding effects of thermal noise, a signal-to-interference plus noise ratio (SINR) 521, as shown by a black line of the graph 520 of FIG. 5B, corresponds to a difference between gain of a transmission channel 512 and gain of an interference 511 in the second base station 412.

Referring to FIG. 5B, due to the interference 511 from the first terminal 421 of the neighboring cell, the uplink channel response fluctuates very widely for each frequency band. Particularly, SINR in a frequency band is very low if the gain of the transmission channel 512 is comparatively smaller and the gain of the interference 511 is comparatively greater.

Specifically, if the first terminal 421 uses a frequency band with a good uplink channel response to the second base station 412 of the neighboring cell, ICI may result. Therefore, exemplary embodiments of the present invention disclose a method in which the first terminal 421 first measures a downlink channel response associated with the second base station 412 of the second cell for each frequency band by using a pilot signal received from the second base station 412, and does not use a frequency band with a good channel response. Thereby, the first terminal 421 may reduce ICI to the second base station 412 of the second cell.

In the present exemplary embodiment, the pilot signal is used as an example of a signal that the first terminal 421 receives from the second base station 412 of the neighboring cell in order to measure the downlink channel response. More specifically, the first terminal 421 may receive a common pilot channel signal corresponding to a common pilot signal between neighboring cells. However, according to the present exemplary embodiment, a received signal may include any type of signal that can be used to measure the downlink channel response.

Also, the channel response for each frequency band may be measured as channel gain of the received signal, a signal strength thereof, or a received signal power thereof. However, according to the present exemplary embodiment, the channel response for each frequency band may include the above-described specific examples, and also may include various types of indexes which may be measured in a numerical value and thus comparable.

Figure 6A:
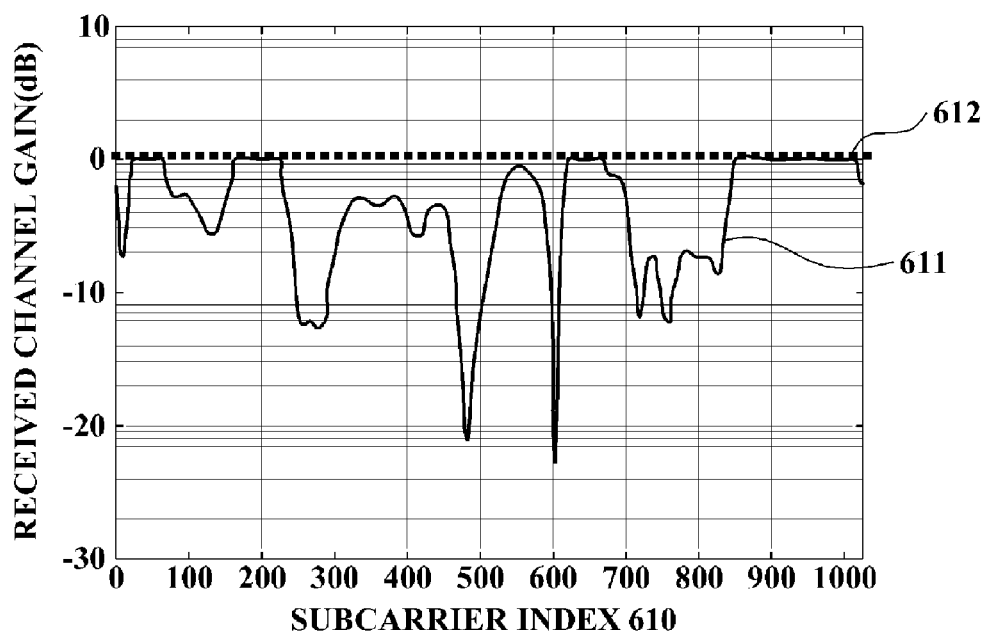
FIG. 6A and FIG. 6B are graphs illustrating the effect on a transmission channel when a portion of a frequency band is not used based on the signal strength of a channel signal received from a base station of a neighboring cell according to an exemplary embodiment of the present invention.
Figure 6B:
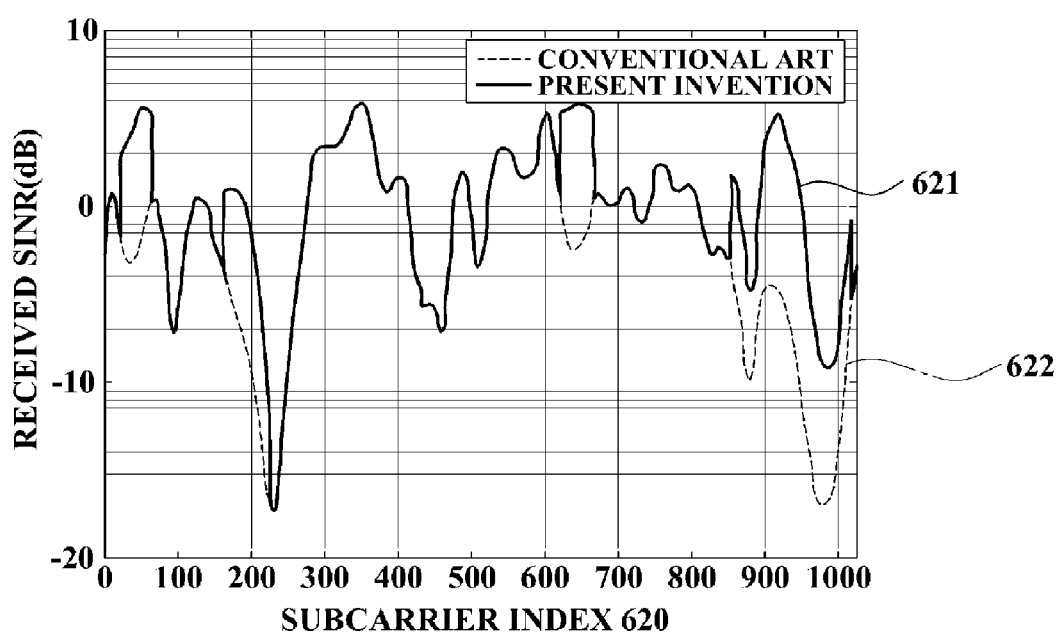

FIG. 6A and FIG. 6B are graphs illustrating the effect on a transmission channel when a portion of a frequency band is not used based on the signal strength of a channel signal received from a base station of a neighboring cell according to an exemplary embodiment of the present invention.

More specifically, FIG. 6A and FIG. 6B are graphs illustrating a change in uplink SINR of the second base station 412 of FIG. 4 when the first terminal 421 does not use a frequency band with a good channel response for an uplink channel.

Referring to FIG. 6A, a graph 610 shows a method for nullifying a corresponding frequency band when gain of a downlink channel 611 is greater than a threshold value 612. In this exemplary embodiment, the threshold value may be uniform, such as 0 dB, for the applicable frequency band. Accordingly, as shown in the graph 610, frequency bands corresponding to subcarrier index values from 20 to 60, from 170 to 230, from 620 to 670, and from 850 to 1000 have a received channel gain of approximately 0 dB and therefore are not used for uplink data transmission. Graph 610 corresponds to channel gain 511 shown in FIG. 5A except those frequency bands greater than the threshold value of 0 dB have been nullified or adjusted down to the threshold value.

Referring to FIG. 6B, a graph 620 shows how an uplink channel response is improved in the second base station 412 of the second cell when the frequency band with the good downlink channel is nullified. In this instance, a portion 622, indicated by a dotted line in the graph 620, indicates the uplink SINR 521 shown in the graph 520 of FIG. 5B where channel gain 511 was not corrected for those frequency bands that exceeded 0 dB. Also, another portion 621, indicated by a solid line, indicates an improved uplink SINR when the particular frequency band is nullified in graph 610 as shown in FIG. 6A according to an exemplary embodiment of the present invention. As shown in FIG. 6B, the SINR is significantly improved in the corresponding frequency bands. Specifically, the significant ICI may be reduced by measuring the downlink channel response associated with the second base station 412 of the second cell, and excluding the frequency band with the good channel response from the uplink channel.

In a multi-path fading environment, a channel response difference for each frequency band changes over time. So that many base stations may measure information about an uplink channel response from a particular terminal and share the measured information, an upper layer service control point (SCP) or mobile switching center (MSC) may be used. However, since an upper layer system such as the SCP or the MSC may not be included in an ALL-Internet Protocol (IP) communication network structure according to a next generation communication network, the terminal measures the downlink channel response in the present exemplary embodiment.

Also, when considering a physical distance between base stations and a number of terminals, it may be difficult to schedule uplink channel resources from each of the terminals in real time while various base stations share information about an uplink channel response associated with each terminal without the SCP or the MSC.

Accordingly, the present invention discloses a method in which each terminal measures a downlink channel response associated with a base station of a neighboring cell, and directly schedules an uplink channel resource based on the measured downlink channel response with the assumption that the downlink channel response and the uplink channel response have a certain correlation therebetween.

Also, the above-described conventional ICI reduction methods allocate a fixed frequency band to be used in an outer boundary of each cell and thereby reflect only long-term fading characteristics. However, short-term fading characteristics may change over time for each frequency band. The exemplary embodiments of the present invention consider short-term fading characteristics, and may control ICI more effectively.

Figure 7:
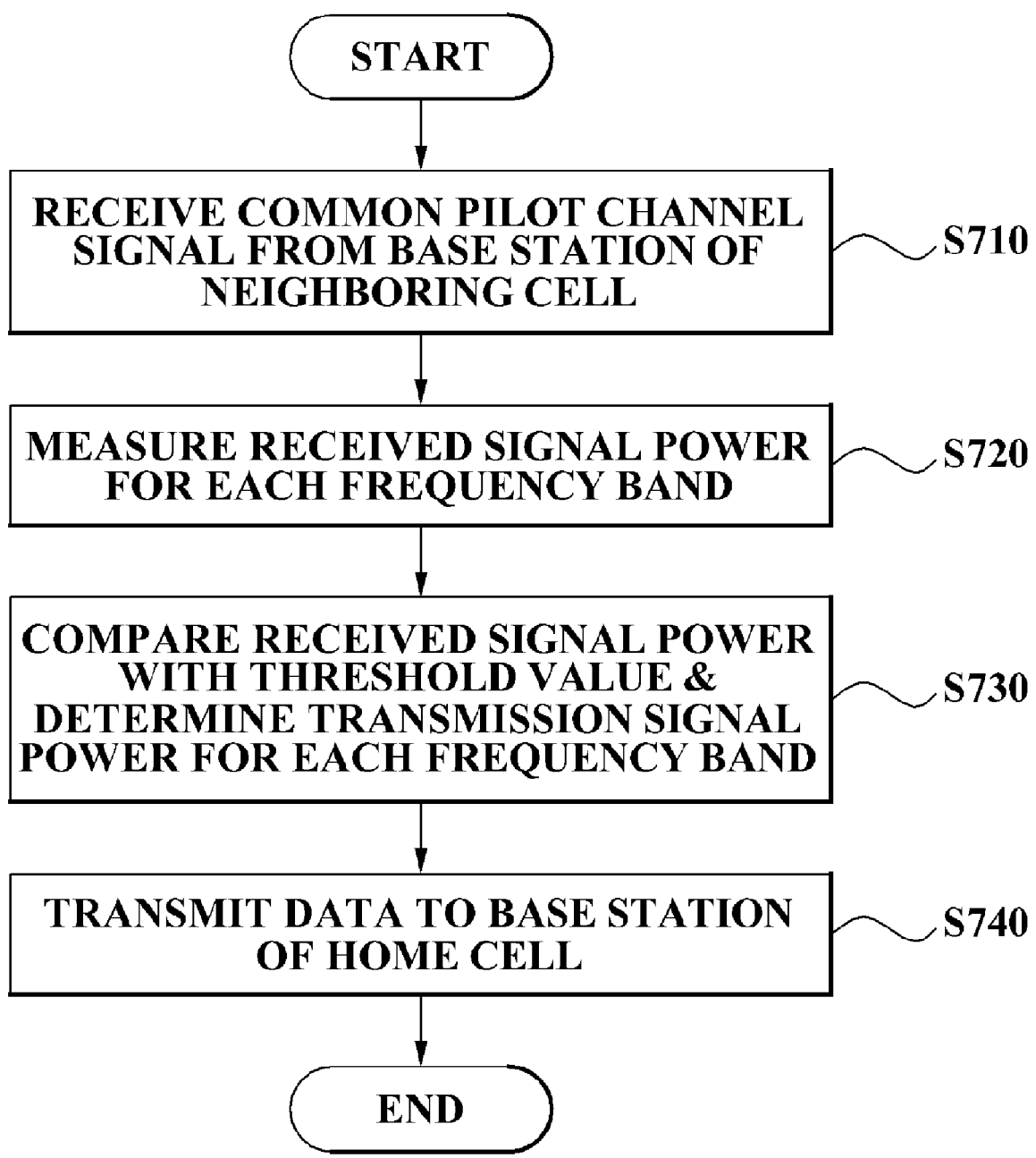
FIG. 7 is a flowchart illustrating a method for managing uplink channel resources and reducing ICI according to an exemplary embodiment of the present invention.

FIG. 7 is a flowchart illustrating a method for managing uplink channel resources and reducing ICI according to an exemplary embodiment of the present invention.

In operation S710, a terminal receives a common pilot channel signal from a base station of a neighboring cell. In other exemplary embodiments of the present invention, the signal received by the terminal is not limited to the common pilot channel signal. When the mobile communication system provides the common pilot channel signal with a common transmission signal pattern to a home cell and the neighboring cell, a channel response may be more accurately measured since the terminal recognizes the transmission signal pattern of the common pilot channel signal.

In operation S720, the terminal measures a received signal power or strength of a downlink channel for each frequency band by using the received common pilot channel signal. The measured channel response for each frequency band may indicate one index of a downlink channel response. As described above, the channel response may be measured for each frequency band by using the signal strength of the received signal or channel gain.

In operation S730, the terminal compares the measured received signal power with a predetermined threshold value, and thereby determines, selects, or adjusts a transmission signal power of an uplink channel for each frequency band based on a result of the comparison. If the received signal power for a frequency band is greater than the threshold value, the transmission signal power for that frequency band may be set to 0 watts in order to exclude the corresponding frequency band from the uplink channel. Also, it is possible to reduce the ICI in the neighboring cell by adjusting or reducing the transmission signal power of a frequency band where the received signal power is greater than the threshold value to a value less than the transmission signal power of another frequency band where the received signal power is less than or equal to the threshold value.

In operation S730, the threshold value is used to determine the frequency band to be excluded from the uplink channel or to determine the transmission signal power for each frequency band. The threshold value may be an absolute threshold value that is equal across the available frequency band. However, depending on characteristics of the mobile communication system, the threshold value may be adjusted or variable across the available frequency band. The transmission signal power is then determined based on the comparison between the measured received signal power and the threshold value. Accordingly, a number of frequency bands to be excluded or to be used with a lower power may be changed based on the channel response. Specifically, in comparison to the prior art, which excludes a particular fixed frequency band from use, the present invention permits a more adaptive control over the ICI.

Specifically, if there are many frequency bands where the received signal power from the base station of the neighboring cell is greater than the threshold value for the corresponding frequency bands, the ICI to the neighboring cell may be greater. Accordingly, if a greater amount of ICI exists, a number of frequency bands having transmission signal power reduced or set to 0 watts also increases, and thus the ICI to the neighboring cell may be maintained at a lower level. Conversely, when few frequency bands have a received signal power that is greater than the threshold value, the ICI to the neighboring cell also decreases. Thus, according to an exemplary embodiment of the present invention, even when the ICI to the neighboring cell is very small, it is possible to reduce an ineffective use of uplink channel resources, which may occur by unnecessarily limiting the use of a certain ratio of frequency band.

Thus, according to an exemplary embodiment of the present invention, a terminal may determine a number of frequency bands of which use is limited, and a location thereof. Accordingly, the terminal may adaptively manage the uplink channel resources based on a channel status.

In operation S740, the terminal transmits data to the base station of the terminal's home cell via the uplink channel including frequency bands based on a transmission signal power profile for each frequency band as determined in operation S730. Also, in operation S740, the terminal may transmit the data in a diversity mode with frequency hopping among the frequency bands. Band-Adaptive Modulation and Coding (AMC) selectively uses a particular frequency band. When a frequency band to be used in a Band-AMC based transmission mode is narrowed, or is excluded from the frequency bands allocated to a corresponding cell by considering a neighboring cell according to an exemplary embodiment of the present invention, an amount of available resources may be extremely limited. However, in the case of the diversity mode, the terminal transmits data with frequency hopping among the frequency bands. Accordingly, even though a frequency band is excluded in data transmission by considering the ICI to the neighboring cell, it may not significantly affect the entire data transmission.

According to another exemplary embodiment of the present invention, a terminal may measure a downlink channel response of a home cell by using a signal received from a base station of the home cell, and determine an uplink transmission signal power for each frequency band by additionally referring to the measured downlink channel response of the home cell.

For example, when a downlink channel response of a neighboring cell and a downlink channel response of the home cell is measured as a received signal power of a signal received from a base station of the home cell and the neighboring cell, the transmission signal power may be determined by comparing the ratio of the received signal power of the signal, received from the neighboring base station and the home base station, with a predetermined threshold value for each frequency band. Specifically, if the received signal power of the signal received from the base station of the home cell is $P_1$, and the received signal power of the signal received from the base station of the neighboring cell is $P_2$, a transmission signal power of a frequency band where the ratio $P_2/P_1$ of two received signal powers is greater than a threshold value may be set to be a value less than the transmission signal power of another frequency band where a ratio $P_2/P_1$ is less than or equal to the threshold value.

Additionally, it is possible to arrange the frequency bands based on the ratio $P_2/P_1$ of the received signal powers and determine the transmission signal power for each frequency band based on the arranged order. In this instance, the ratio $P_2/P_1$ of the received signal powers may be a weighted ratio that reflects a weight value with respect to each received signal power. Also, the weight value may have a different value for each frequency band. For example, the weight value to be applied to the ratio $P_2/P_1$ of the received signal power for each frequency band may reflect a transmitting/receiving profile between the terminal and the base station. Specifically, a comparatively greater weight value may be assigned to a channel in which data is stably transmitted and received for more than or equal to a predetermined time. Also, the terminal may determine the weight value based on weight value information received from the base station. Specifically, the base station may transmit the weight value information to which the terminal may refer when determining the weight value by considering the channel status associated with the terminal of the home cell and also the channel status associated with the terminal of the neighboring cell. Also, the terminal may determine the weight value by referring to various types of information, such as a relative location from the base station, and more specifically, a cell boundary location, and a number of terminals located in the home cell.

As described above, when using a resource management scheme based on the ICI to the neighboring cell and also a data transmission channel status, the ICI to the neighboring cell may be reduced. Also, a frequency band with a good channel status may be selected. Also, when adjusting an optimum weight value, the entire system capacity may be maximized.

According to still another exemplary embodiment of the present invention, the terminal may determine whether to consider the downlink channel status of the neighboring cell by first evaluating the downlink channel response of the home cell.

Figure 8:
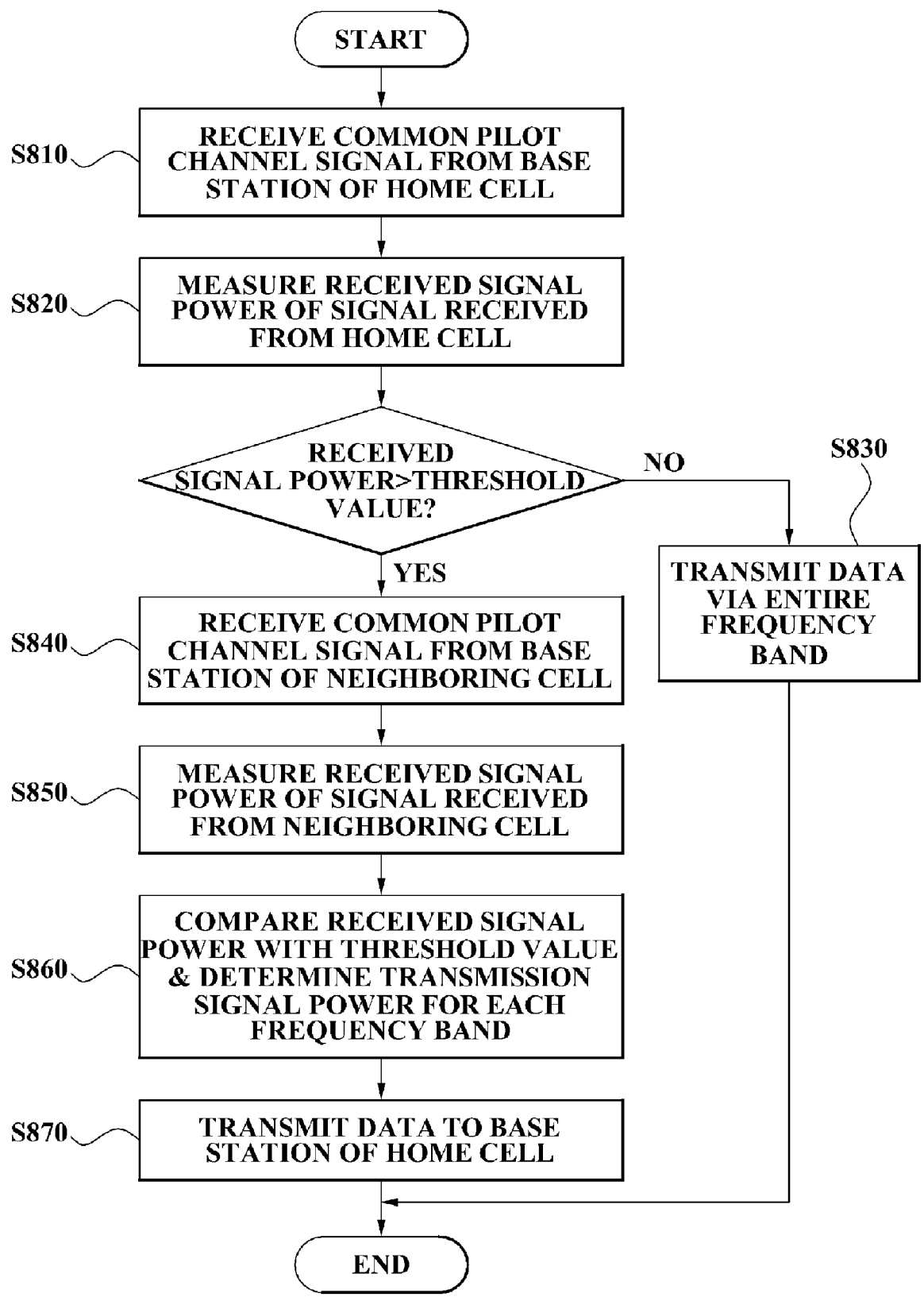
FIG. 8 is a flowchart illustrating a method for managing uplink channel resources and reducing ICI according to another exemplary embodiment of the present invention.

FIG. 8 is a flowchart illustrating a method of managing uplink channel resources and reducing ICI according to another exemplary embodiment of the present invention.

In operation S810, a terminal receives a common pilot channel signal from a base station of a home cell. In operation S820, the terminal measures a downlink channel response of the home cell by using the received signal power of the common pilot channel signal.

If there is no frequency band or few frequency bands where the received signal power is greater than a predetermined threshold value, the channel response of the home cell may be poor. In this case, rather than limit the use of a particular frequency band to prevent the ICI to the neighboring cell, the terminal may use a large number of frequency bands to improve the chance of successful data transmission. Accordingly, when the downlink channel response of the home cell is poor, data may be transmitted to the base station of the home cell by using the entire applicable frequency band in operation S830.

However, if there are many frequency bands where the received signal power from the home cell is greater than the threshold value, data may be successfully transmitted in the diversity mode even if the use of some frequency band is limited. Accordingly, in this case, as described above with reference to FIG. 7, it is possible to measure the downlink channel response associated with the neighboring cell and thereby limit the use of certain frequency bands based on the measured downlink channel response.

Operations S840, S850, S860, and S870 shown in FIG. 8 correspond to operations S710, S720, S730, and S740 shown in FIG. 7, and thus repetitive detailed descriptions related thereto will be omitted.

In FIG. 4, FIG. 5, FIG. 6, FIG. 7, and FIG. 8, only one neighboring cell has been described for convenience of description. However, the present invention is not limited thereto and the present invention may be applicable if more than one neighboring cell exists. Specifically, at least two neighboring cells may have ICI based on a location of the terminal in a cell. In this instance, the terminal may receive a common pilot channel signal from a base station of each neighboring cell, and determine frequency bands having limited availability for uplink data transmission by sequentially or simultaneously considering the downlink channel response of each neighboring cell.

Also, the terminal may select a transmission frequency band by considering only a downlink channel response of a neighboring cell that may cause significant ICI from among a plurality of neighboring cells, or may determine, reduce, adjust, or select a power of the transmission frequency band. For example, it is possible to select only a predetermined number of top frequency bands based on a received signal power of a common pilot channel signal received from a base station of each neighboring cell, or based on the mean strength of the received signal, and thereby enable the selected frequency band to control the transmission signal power of the transmission frequency band.

Also, it is possible to assign a different weight value based on a mean value derived from each neighboring cell, and thereby reflect the downlink channel response of the neighboring cells to determine the transmission signal power for each frequency band.

The ICI reduction method and the uplink channel resource management method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Different methods of controlling ICI are disclosed in the U.S. patent application Ser. No. 11/846,093, which is assigned to the same assignee of the present application and is filed on the same date as the present application, Aug. 28, 2007.

Figure 9:
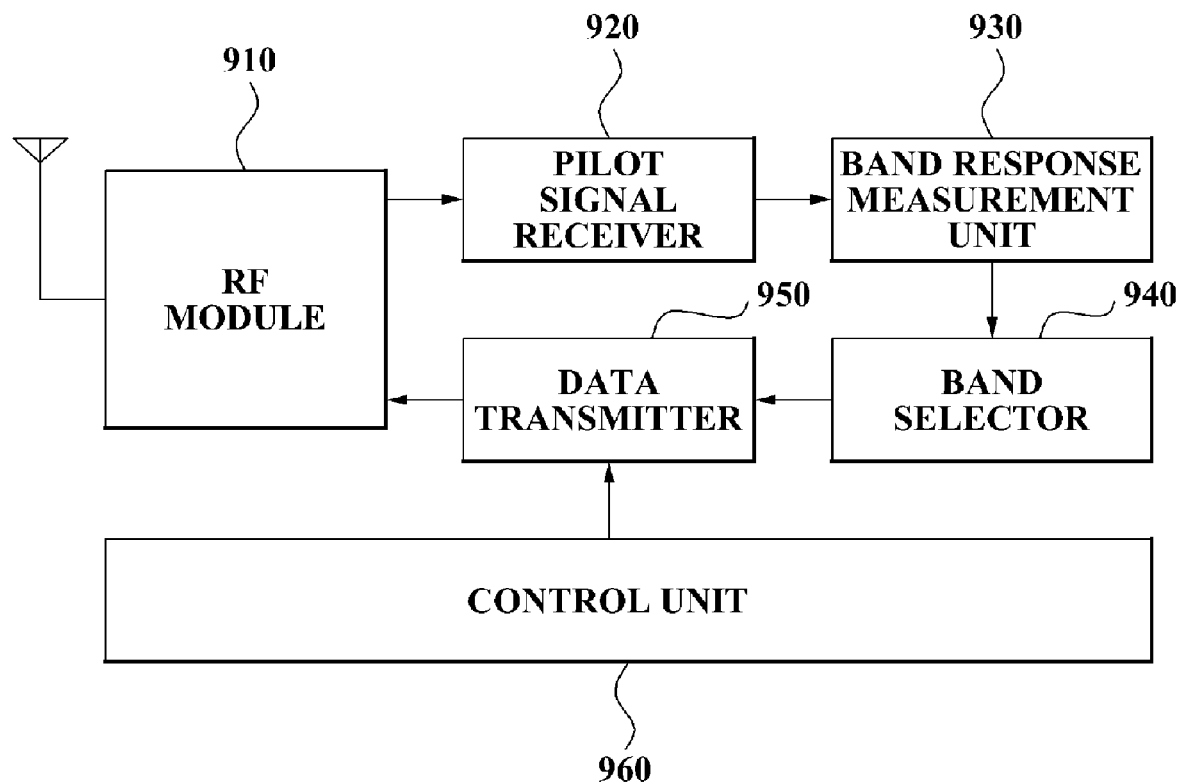
FIG. 9 is a block diagram illustrating an internal configuration of a terminal according to an exemplary embodiment of the present invention.

FIG. 9 is a block diagram illustrating an internal configuration of a terminal according to an exemplary embodiment of the present invention.

The terminal includes a radio frequency (RF) module 910, a pilot signal receiver 920, a band response measurement unit 930, a band selector 940, a data transmitter 950, and a control unit 960.

The RF module 910 is connected to an antenna, and transmits a signal to and receives a signal from a base station via a wireless frequency band. The pilot signal receiver 920 extracts a pilot signal from a radio signal. The radio signal may be received from a base station of a neighboring cell via the RF module 910. The extracted pilot signal may be a common pilot channel signal.

The band response measurement unit 930 is connected to the pilot signal receiver 920, and measures a channel response of the wireless channel by using the received pilot signal. According to an exemplary embodiment, the channel response is measured based on the signal strength of the pilot signal for each frequency band or channel gain. Accordingly, the entire applicable frequency band allocated to the channel may be divided into frequency bands with a good channel response and frequency bands with a poor channel response. In this instance, the frequency bands with greater channel gain or greater received signal strength higher than a threshold value may correspond to the frequency bands with the good channel response. Conversely, the frequency bands with the smaller channel gain or lower received signal strength lower than the threshold value may correspond to the frequency bands with the poor channel response.

The band selector 940 selects or determines a transmission frequency band for data transmission based on the measured channel response for each frequency band. The data transmitter 950 transmits data to the base station of the home cell via the selected transmission frequency band.

More particularly, the band selector 940 excludes the frequency band with the good channel response from the transmission frequency band. Accordingly, the ICI may be reduced. Specifically, when carrying data in a frequency band with a good downlink channel response from the neighboring cell, and transmitting the data to the base station of the home cell, the frequency band, which may cause ICI in the neighboring cell, is excluded from the uplink data transmission. Accordingly, it is possible to reduce ICI in a neighboring cell.

According to another exemplary embodiment of the present invention, the band selector 940 may reduce the ICI amount to the neighboring cell by allocating a comparatively lower power to the frequency band with the good channel response when still using the frequency band with the good channel response for uplink data transmission.

According to still another exemplary embodiment of the present invention, the pilot signal receiver 920 receives a pilot signal from the base station of the home cell so that the band response measurement unit 930 may first measure a channel response of a downlink channel for each frequency band from the base station of the home cell. When the downlink channel response from the base station of the home cell is generally not good, that is, when there are few frequency bands having a signal strength of the pilot signal or a signal power that is greater than a predetermined threshold value, the band selector 940 may use the entire applicable frequency band for the uplink data transmission. In other cases, as described above, the band selector 940 may measure the downlink channel response associated with the neighboring cell, and may select a transmission frequency band for each frequency band based on the measured channel response, or may determine a transmission signal power of a corresponding frequency band.

Specifically, unless a channel response of a home cell is poor enough to cause ICI in a neighboring cell even though uplink data transmission to a base station of the home cell is performed by additionally considering a channel status of the home cell, it is possible to use the entire applicable frequency band without considering a channel response associated with the neighboring cell in order to reduce the risk of an unsuccessful uplink data transmission in the home cell.

The control unit 960 transfers data to be transmitted to the base station of the home cell via the selected frequency band to the data transmitter 950. Also, the control unit 960 generates a control signal to control the configuration elements included in the terminal. In this instance, the control unit 960 may include at least one of microprocessor, a digital signal processor (DSP), and an application specific integrated circuit (ASIC) chip for performing the functions, along with a memory to store transmission data.

The term "mobile communication terminal", that is, "terminal", used throughout the present specification includes any type of mobile communication device, such as a Personal Digital Cellular (PDC) phone, a personal communication service (PCS) phone, a personal handyphone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a Digital Multimedia Broadcasting (DMB) phone, a smart phone, and an OFDM or OFDMA communication terminal; portable terminals such as a personal digital assistant (PDA), a hand-held PC, a notebook PC, a laptop computer, a wireless broadband Internet (WiBro) terminal, an MP3 player, and an MD player; and all types of hand-held based wireless communication devices including an International Mobile Telecommunication (IMT)-2000 providing international roaming service and extended mobile communication service. Also, the mobile communication terminal may include a predetermined communication module such as a CDMA module, a Bluetooth module, an Infrared Data Association (IrDA) module, a wired/wireless LAN card and a wireless communication device which is provided with a global positioning system (GPS) chip enabling tracking of a position via a GPS. Also, the mobile communication terminal may include a microprocessor which can play multimedia and perform a certain calculation operation, and thereby may perform calculation operation.

The scope of the present invention includes a mobile communication system which includes a terminal constructed as described above, and a base station which transmits a signal to the terminal located in a neighboring cell, so that the terminal may measure a channel response of the signal and determine a transmission signal power for each frequency band.

According to an exemplary embodiment of the present invention, a mobile communication system is a wireless communication system based on an OFDM scheme. Also, a terminal and a base station included in the mobile communication system may transmit and receive a signal based on a TDD scheme. Specifically, in the OFDM system based on the TDD scheme, a downlink channel response and an uplink channel response may be assumed to be identical to each other. Accordingly, it is possible to measure the downlink channel response by using the pilot signal received from a base station of the neighboring cell, and control signal power associated with the uplink channel by referring to the measured downlink channel response.

However, as described above, there may be a correlation between the uplink channel response and the downlink channel response. Accordingly, it is possible to measure the downlink channel response and thereby apply the measured downlink channel response to all types of mobile communication systems which can estimate the uplink channel response. Accordingly, the term "mobile communication system" used throughout the present specification may be widely interpreted and may indicate any type of mobile communication system in which there is a certain correlation between the downlink channel response and the uplink channel response that can be known or measured.

The configuration of the mobile communication terminal according to an exemplary embodiment of the present invention has been described above with reference to FIG. 9. Hereinafter, a configuration of a mobile communication system according to another exemplary embodiment of the present invention will be briefly described. The descriptions related to the ICI reduction method and the uplink resource management method, described with reference to FIG. 4, FIG. 5, FIG. 6, FIG. 7, and FIG. 8, may be applicable as is and thus further detailed descriptions related thereto will be omitted herein.

According to the present invention, an ICI reduction method and an uplink channel resource management method are disclosed in which a terminal can measure a channel response for each frequency band by using a base station of a neighboring cell, and determine a signal power of an uplink signal for each frequency band based on the measured channel response.

Accordingly, a method for allocating a fixed frequency band to each cell, which may cause an ineffective operation of wireless resources, may be eliminated and thus adaptable cell planning is enabled.

Also, according to embodiments of the present invention, it is possible to transmit data in a diversity mode within a frequency band, selected for a current channel status, and thereby more appropriately use frequency diversity effect.

Also, according to embodiments of the present invention, it is possible to use a normal MAP. Also, a process of notifying of a location and quality of data in a frame may be simplified. Accordingly, unnecessary overhead may be eliminated and the entire system throughput may be improved.

Also, according to embodiments of the present invention, it is possible to more adaptively manage uplink resources based on a channel status without pre-fixing a location and range of frequency band of which use is limited.

Also, according to embodiments of the present invention, it is possible to exclude a frequency band based on a predetermined threshold value, or to select a frequency band to use only a low power. Accordingly, it is possible to more effectively control ICI by changing a number and scope of frequency bands to be used for data transmission based on a channel status.

Also, according to embodiments of the present invention, it is possible to more accurately measure an ICI amount and thereby more effectively reduce the ICI by reflecting long-term fading characteristics, which may be determined based on topographical characteristics, and short-term fading characteristics, which may change over time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for managing uplink channel resources in a mobile communication terminal located in a first cell, comprising:

measuring a received signal power of a first downlink channel signal for a plurality of frequency bands, the first downlink channel signal transmitted from a base station of a second cell; and determining a transmission signal power of an uplink channel signal for each frequency band of the plurality of frequency bands based on the received signal power, wherein the plurality of frequency bands comprises a first frequency band and a second frequency band, and transmission signal power for the first frequency band is selected to be lower than transmission signal power for the second frequency band based on the received signal power, and wherein determining the transmission signal power further comprises:

comparing the received signal power with a threshold value that is uniform across the frequency bands; and excluding the first frequency band from the uplink channel signal or adjustinq power of the first frequency band downward if the first frequency band has a transmission signal power that is greater than the threshold value.

2. The method of claim 1, wherein determining the transmission signal power comprises adjusting the transmission signal power for the first frequency band having a received signal power that is greater than the threshold value to a reduced transmission signal power that is less than or equal to the threshold value.

3. The method of claim 1, wherein determining the transmission signal power comprises excluding the first frequency band from the uplink channel signal by setting the transmission signal power for the first frequency band to zero watts if the first frequency band has a received signal power that is greater than a threshold value.

4. The method of claim 1, further comprising:
measuring a received signal power of a second downlink channel signal for the frequency bands, the second downlink channel signal transmitted from a base station in the first cell,
wherein determining the transmission signal power further comprises referring to the received signal power of the second downlink channel signal.

5. The method of claim 4, wherein determining the transmission signal power further comprises:
comparing a ratio of the received signal power of the second downlink channel signal to the received signal power of the first downlink channel signal with the threshold ratio for each frequency band; and
adjusting the transmission signal power based on the comparison if the ratio exceeds the threshold ratio.

6. The method of claim 4, wherein determining the transmission signal power comprises:
arranging the plurality of frequency bands based on a ratio of the first received signal power to the second received signal power; and
selecting the transmission signal power for each frequency band based on the arranged order.

7. The method of claim 4, further comprising:
comparing the received signal power of the second downlink channel signal with the threshold value; and
selecting each frequency band for the uplink channel signal if the received signal power of the second downlink channel signal is less than or equal to the threshold value in each frequency band.

8. The method of claim 1, wherein the uplink channel signal and the first downlink channel signal transmit via a same plurality of frequency bands.

9. The method of claim 1, wherein the first downlink channel signal comprises a common pilot channel signal.

10. The method of claim 1, wherein the first downlink channel signal and the uplink channel signal transmit data according to an orthogonal frequency division multiplexing (OFDM) scheme.

11. The method of claim 1, wherein the first downlink channel signal and the uplink channel signal transmit the data according to a Time Division Duplexing (TDD) scheme.

12. A method for transmitting data in a mobile communication system, comprising:
receiving a pilot signal from a first base station via a wireless channel;
measuring a channel response of the wireless channel by using the pilot signal;
determining a transmission signal power for each of a plurality of frequency bands used for data transmission based on the channel response, wherein the plurality of frequency bands comprises first frequency bands and second frequency bands, and transmission signal power for the first frequency bands is selected to be lower than transmission signal power for the second frequency bands based on the channel response; and
transmitting data to a second base station based on the transmission signal power for each frequency band,
wherein the channel response comprises a signal strength of the pilot signal for each frequency band, and
determining the transmission signal power further comprises:
comparing the signal strength for each frequency band with a threshold value; and
excluding the first frequency bands from the frequency bands for transmitting data by setting the transmission signal power for the first frequency bands to zero watts if the signal strength for the first frequency bands is greater than the threshold value.

13. The method of claim 12, wherein the channel response comprises a signal-to-interference plus noise ratio (SINR) or a signal gain measured for each frequency band of the pilot signal.

14. The method of claim 12, wherein determining the transmission signal power comprises:
dividing the frequency bands into the first frequency bands with a good channel response and the second frequency bands with a poor channel response; and
selecting a transmission signal power of the first frequency bands that is less than a transmission signal power of the second frequency bands.

15. The method of claim 12, wherein the threshold value is uniform for the frequency bands.

16. The method of claim 12, wherein the mobile communication system comprises a wireless system using an OFDM scheme.

17. The method of claim 12, wherein transmitting data comprises transmitting data in a diversity mode with frequency hopping among the frequency bands.

18. The method of claim 12, further comprising:
receiving a plurality of pilot signals from a plurality of base stations respectively arranged in a plurality of neighboring cells,
wherein the channel response is measured with respect to the plurality of pilot signals.

19. A computer-readable recording medium storing a program for implementing the method of claim 1,
wherein the computer-readable recording medium comprises a hard disk, a floppy disk, a magnetic tape, optical media, magneto-optical media, read-only memory (ROM), random access memory (RAM), flash memory, or hardware configured to store and perform program instructions.

20. A computer-readable recording medium storing a program for implementing the method of claim 12,
wherein the computer-readable recording medium comprises a hard disk, a floppy disk, a magnetic tape, optical media, magneto-optical media, read-only memory (ROM), random access memory (RAM), flash memory, or hardware configured to store and perform program instructions.

* * * * *